United States Patent [19]
Eba

[11] Patent Number: 5,101,143
[45] Date of Patent: Mar. 31, 1992

[54] SPINDLE CONTROL SYSTEM

[75] Inventor: Koji Eba, Niwa, Japan

[73] Assignee: Kabushiki Kaisha Okuma Tekkosho, Aichi, Japan

[21] Appl. No.: 586,979

[22] Filed: Sep. 24, 1990

[30] Foreign Application Priority Data

Sep. 29, 1989 [JP] Japan .................. 1-254103

[51] Int. Cl.$^5$ ........................................... H02K 7/116
[52] U.S. Cl. ........................................ 318/11; 318/12
[58] Field of Search .................... 318/11, 12, 15, 552, 318/553, 554, 555, 556, 557, 558; 82/67, 68, 905; 74/342, 849, 861

[56] References Cited

U.S. PATENT DOCUMENTS

| 2,990,503 | 6/1961 | Clark | 318/11 |
| 3,705,339 | 12/1972 | Rhoades et al. | 318/571 |
| 4,096,418 | 6/1978 | Marumoto et al. | 318/12 |
| 4,569,013 | 2/1986 | Kishi et al. | 318/12 X |
| 4,800,325 | 1/1989 | Nakanishi | 318/661 |
| 4,814,681 | 3/1989 | Unno et al. | 318/569 |
| 4,992,712 | 2/1991 | Fujimoto et al. | 318/569 |

Primary Examiner—Bentsu Ro
Attorney, Agent, or Firm—Wenderoth, Lind & Ponack

[57] ABSTRACT

A spindle control system enables a gear change while a spindle is rotating by calculating the position of a motor shaft when gears are reengaged by a target position calculating circuit, and outputting speed commands for the motor shaft by a position control circuit based on the calculation result, and switching by a switching circuit so as to input the speed commands to a speed control circuit. That is, the spindle control system is of the type which controls a spindle in speed and position by a motor via a variable speed gear mechanism, and which includes: a target position calculating circuit for calculating the position of a motor shaft when gears are engaged therewith based on a gear command, the detected position of the spindle and the detected position of a motor shaft; a position control circuit for outputting speed commands for the motor shaft based on the result of the calculation by the target position calculating circuit, and a switch circuit for switching circuits so as to input the speed commands outputted from the position control circuit to a speed control circuit for the motor when gear engagement is to be changed.

6 Claims, 4 Drawing Sheets

SPINDLE CONTROL SYSTEM

BACKGROUND OF THE INVENTION

This invention relates to a spindle control system for machine tools having a variable speed gear mechanism.

FIG. 1 shows an embodiment of a prior art spindle control system used for a spindle with a variable speed gear mechanism.

Position command $\theta_S^*$ or speed command $\omega_S^*$ for a spindle 9 are inputted to a speed command circuit 1. The speed command circuit 1 detects a rotating position $\theta_S$ of the spindle 9 through a spindle rotary encoder 8 and calculates a speed command $\omega_S^* = K_p(\theta_S - \theta_S^*)$ by means of a position loop gain coefficient Kp when the command is the position commands $\theta_S^*$. The speed command $\omega_S^*$ is converted into a speed command $\omega_M^* = G_M/G_S \times \omega_S^*$ for a motor shaft by using the gear ratio $G_M/G_S$ between the spindle 9 and the motor shaft of the gears presently engaged, and then is inputted to a speed control circuit 2. The speed control circuit 2 detects the position $\theta_M$ of the motor shaft by means of a motor shaft rotary encoder 4, and controls an electric current passing through a motor 5 by a power converter 3 so that the timewise change $\omega_M$ of the position $\omega_M$ becomes conincided with $\omega_M^*$.

When the gear ratio $G_M/G_S$ is to be changed in a conventional spindle control system as described above, the motor 5 should be stopped temporarily and gear 7 which is slidable an the axial direction is moved by an actuator 6 so as to disengage the gear 7, and the speed command $\omega_S^*$ is given to swing the motor shaft at a low speed while moving gears to be engaged as newly instructed.

As described above, the conventional spindle control system could not cause th spindle to agree with the motor shaft in position and in speed as instructed by a command from outside. Therefore, when the gears were to be newly engaged, both the motor shaft and the spindle had to be inconveniently suspended temporarily in order to make the peripheral velocities of the gears which are to be engaged agree with each other. However, when the gears were to be engaged in the prior art, both gears were simply pushed to press-fit each other without aligning angles thereof to thereby apply unnecessary loads on the teeth of the gears as well as to require much time for the gear ratio changing.

There has been proposed a system which allows gears to be engaged at a new gear ratio if the difference of the speed of both gears in rotation remains within a certain scope by providing a mechanical synchro (motor) unit on the system. For example, Japanese Patent Application No. 168637/1980 proposed a circuit which can detect agreement of the revolution number of the gears for such purpose. However, such systems are defective in that the cost of gears becomes high and it requires a larger space for installation.

SUMMARY OF THE INVENTION

This invention was conceived to eliminate such problems encountered in the prior art and aims at providing a spindle control system which can remarkably shorten the time required for gear ratio changing, reduce the loads on the gears, extend the life of gears and simplify the shape thereof without providing a synchro (motor) mechanism on the gear system.

According to one aspect of this invention, for achieving the objects described aobve, there is provided a spindle control system of the type which controls a spindle in speed and position by a motor via a varible speed gear mechanism, comprising a target position calculating means for calculating the position of a motor shaft when gears are engaged therewith based on a gear command, the detected position of said spindle and the detected position of a motor shaft, a position control means for outputting speed commands for the motor shaft based on the result of the calculation by said target position calculating means, and a switch means to switch circuits so as to input said speed commands outputted from said position control means to a speed control circuit for said motor when gear engagement is to be changed.

The nature, principle and utility of the invention will become more apparent from the following detailed description when read in conjunction with the accompanying drawings.

DESCRIPTION OF THE PREFERRED EMBODIMENT

An embodiment of this invention system will now be described in detail referring to attached drawings.

Figure 1:
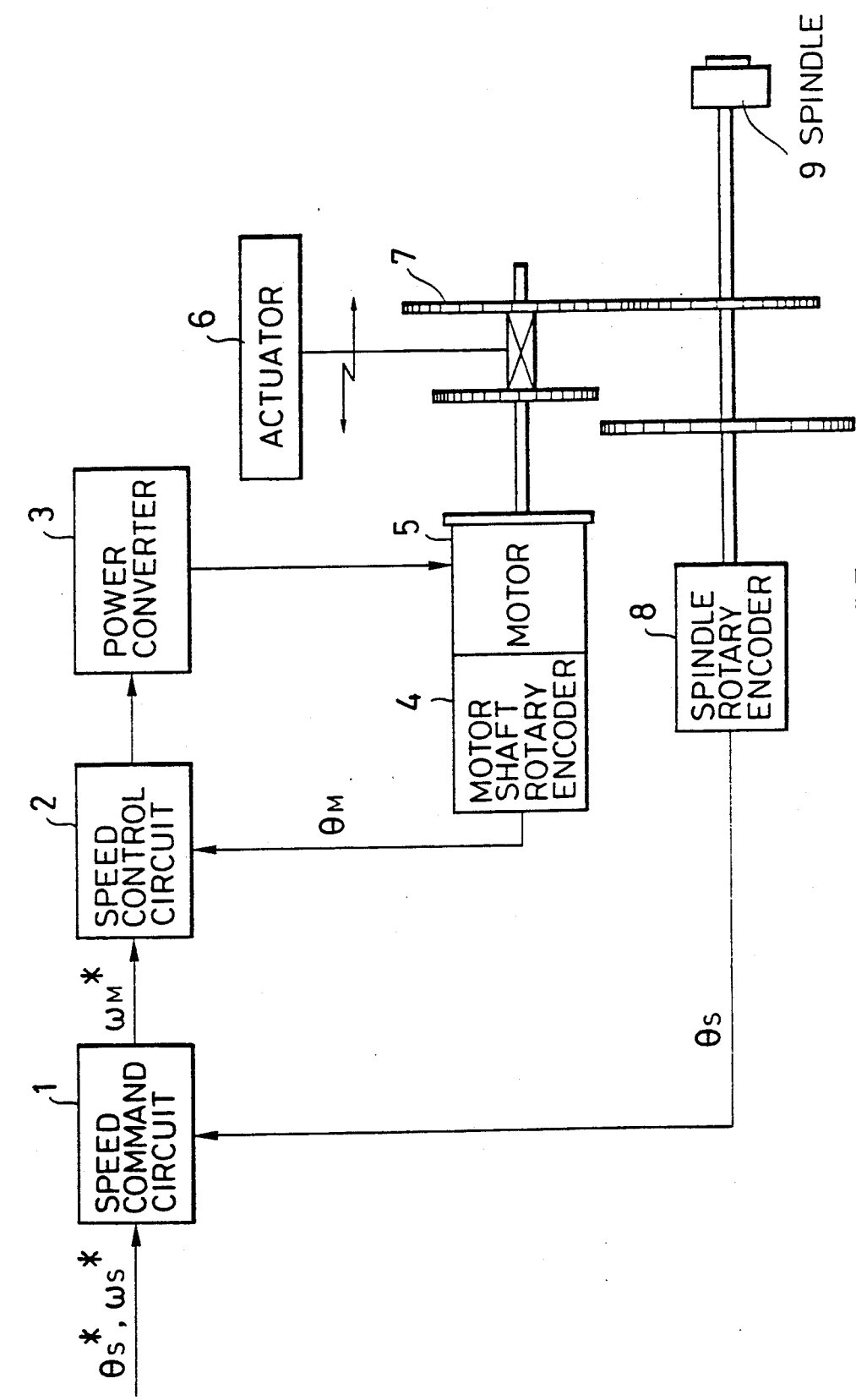
FIG. 1 is a block diagram showing a prior art spindle control system.
Figure 2:
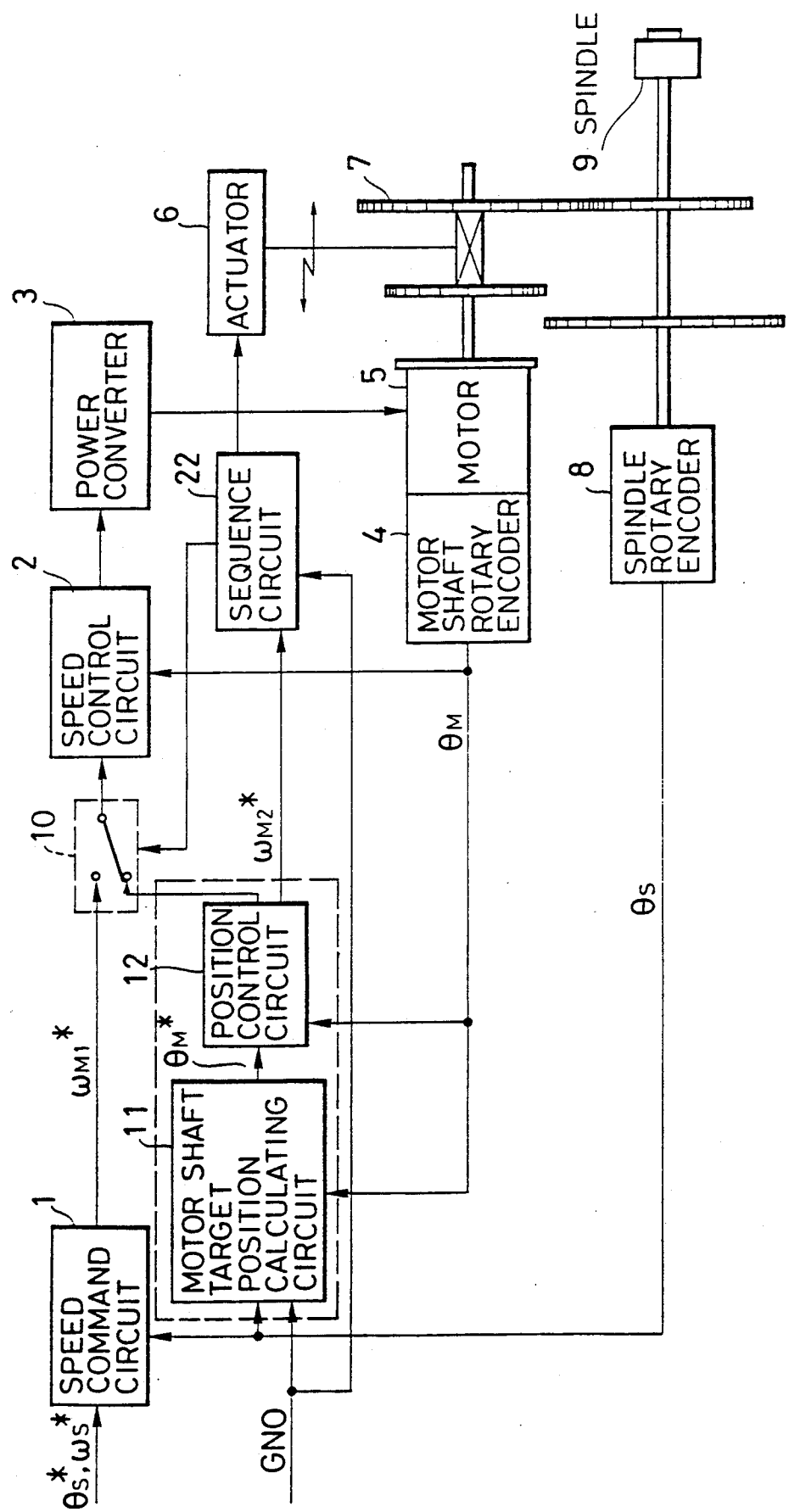
FIG. 2 is a block diagram showing an embodiment of the spindle control system according to this invention.

FIG. 2 is a block diagram showing an embodiment of this invention system in correspondence to FIG. 1, and the same parts are denoted with the same reference numerals.

The spindle control system according to this invention is newly provided with a motor shaft target position calculating circuit 11 which calculates a target position $\theta_M^*$ of a motor shaft based on the gear command GNO, the spindle position $\theta_S$ and the motor shaft position $\theta_M$; a sequence circuit 22 for gear change which detects the change in gear command GNO and gives a series of commands for sequence of the gear change; a position control circuit 12 which calculates a motor shaft speed command $\omega_{M2}^*$ for making the target position $\theta_M^*$ agree with the motor shaft position $\theta_M$, and a switch 10 which selects either an output $\omega_{M1}^*$ of the speed command circuit 1 or an output $\omega_{M2}^*$ of the position control circuit 12.

When no change is needed in gear engagement, a rotary command $\omega_{M1}^*$ is given to the speed control circuit 2 by means of the switch 10 to perform the operation similar to the prior art system. When a change is to be made in gears, on the other hand, while the gear commmand GNO which indicates the set of gears presently engaged is being given to the motor shaft target position calculating circuit 11, the switch 10 is shifted so as to input the motor shaft speed command $\omega_{M2}^*$, and the gear 7 is released by the actuator 6 under the state that the motor shaft is in synchronism with the spindle 9. Subsequently, since the gear command GNO is converted to the value altered by the gear change, the motor shaft is controlled anew to the position and speed so as to be engaged with the gears on the spindle 9 depending on the newly instructed set, and gears set after the change are engaged with each other by the actuator 6.

Figure 3:
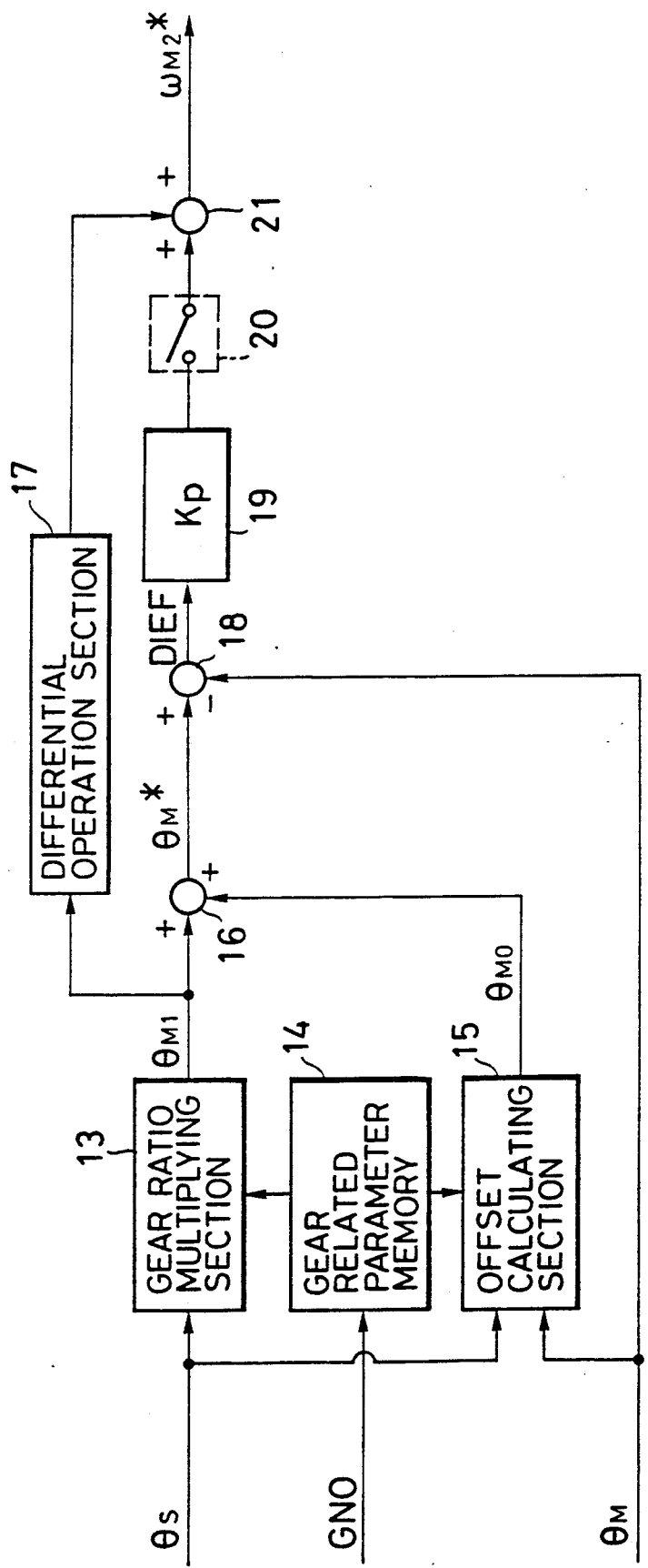
FIG. 3 is a block diagram showing details of a motor shaft target position calculatiing circuit.

FIG. 3 shows in detailed block diagram component parts of the motor shaft target position calculating circuit 11 and the position control circuit 12 in FIG. 2.

In the figure, the spindle position $\theta_S$ (having the positional information for plural times of the common multiple of the gear ratio between the spindle 9 and the motor shaft) is converted to the multiple rotary position $\theta_M'$ on the motor shaft by being multiplied with the gear ratio $G_M/G_S$ by a gear ratio multiplying section 13. Because the multiple rotary position $\theta_M'$ does not reflect the mechanical relationship of gear engagement, it retains a prescribed offset angle from the motor position at which the gears are engaged. Therefore, the peripheral velocities of gears which are to be engaged are made to coincide by calculating the timewise change on the multiple rotary position $\theta_M'$ by a differential operation section 17 and using the same as the speed command $\omega_{M2}^*$ for the motor shaft. After the peripheral velocities of the gears coincide with each other, the offset angle $\theta_{M0}$ is calculated based on the spindle position $\theta_S$ and the motor shaft postion $\theta_M$ in a manner described below.

A gear related parameter memory section 14 stores not only the aforementioned gear ratio $G_M/G_S$ but the motor shaft angle $\theta_{MOFFSET}$ at which gears are engaged at $\theta_S=0$, and the numbers $N_M$ and $N_S$ of gear teeth, in correspondence to the respective gear commands. Since the motor shaft is engaged with the gear at every 360 degree/$N_M$ if the number of gear teeth is represented by $N_M$ on the side of the motor shaft, the relationship holds since $\theta_{MOFFSET} < 360$ degree/$N_M$. It then becomes possible to obtain remainders $\theta_{S1}$ and $\theta_{M1}$ of the division of 360 degree/$N_S$ and 360 degree/$N_M$ based on the respective gear tooth numbers $N_S$ and $N_M$ out of the spindle position $\theta_S$ and the motor shaft position $\theta_M$. Then, the angle at which the motor shaft is engaged or $\theta_{M2} = \theta_{S1}/G_S + \theta_{MOFFSET}$ is obtained out of the remainder $\theta_{S1}$, and ultimately the difference between $\theta_{M1}$ and $\theta_{M2}$ becomes the offset angle of the motor shaft as $\theta_{M0} = \theta_{M1} - \theta_{M2}$ in an offset calculating section 15. The value $\theta_{M0}$ is added to the multiple rotary position $\theta_M'$ by an adder 16 and becomes the motor shaft position command $\theta_M^*$. The motor shaft position command $\theta_M^*$ is subtracted from the multiple rotary position $\theta_M'$ by a subtracter 18, and multiplied by a position loop gain $K_P$ and added to time diferential value of the multiple rotary position $\theta_M'$ by the adder 21 after passing a switch 20 to become the motor speed command $\omega_{M2}^*$. This controls the motor shaft position $\theta_M$, so as to agree with the motor shaft position command $\theta_M^*$ to prepare and maintain the peripheral velocities and angles of the gears in an engageable state.

Although no idle gears are provided between the motor shaft and the spindle 9 for transmission of power in aforementioned embodiment, this invention is applicable to the case where an idle gear is provided by obtaining the angle of the idle gear shaft from either the motor shaft or the spindle 9 which is constantly in engagement. In sucha case, since an idle gear has a certain backlash, it would be effective to instruct some swinging for the motor shaft position command $\theta_M^*$ when the gears are to be engaged.

Figure 4A:
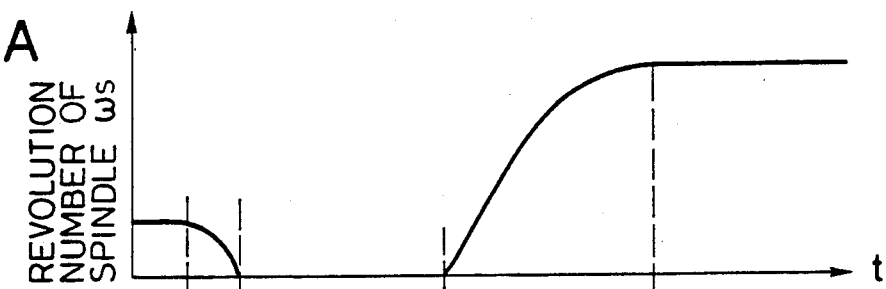
FIGS. 4A through 4D are graphs showing chronological changes of the revolution numbers $\omega_S$ and $\omega_M$ of the spindle and motor shaft of this invention in comparison with the prior art.
Figure 4B:
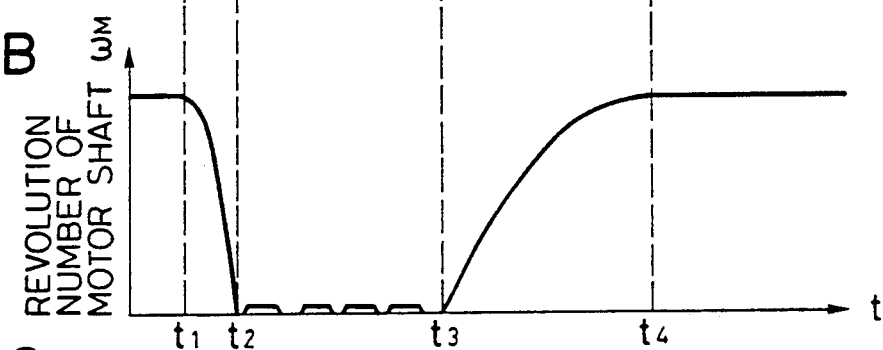
Figure 4C:
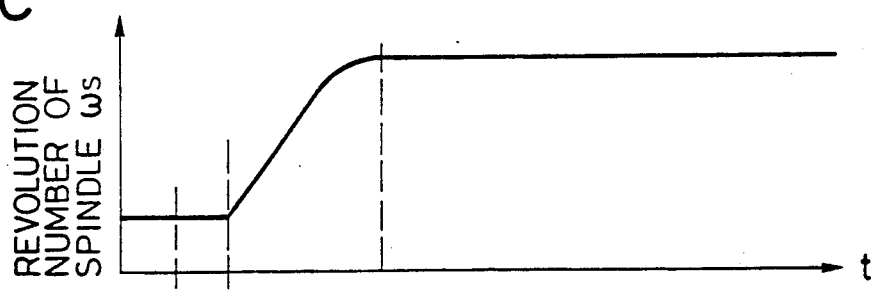
Figure 4D:
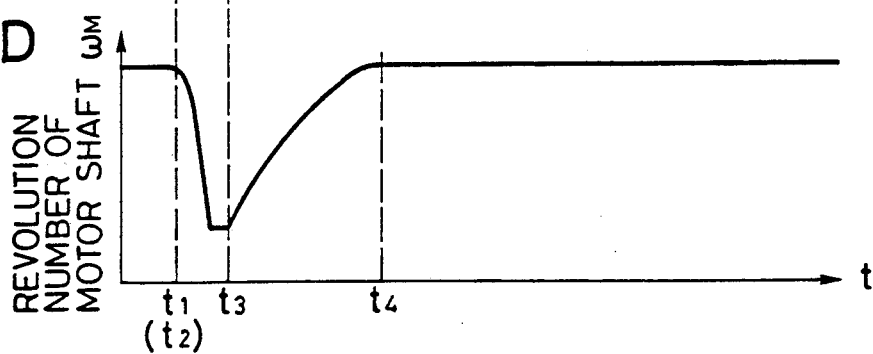

FIGS. 4A through 4D are graphs where changes in the revolution nmbers $\omega_S$ and $\omega_M$ of the spindle and motor shaft are plotted against the time axis when the revolution number $\omega_S$ of the spindle is increased by four times by changing the gear ratio while a revolution number of the motor is maintained at the same value. In the graphs, FIGS. 4A and 4B show the result by the conventional spindle control system while FIGS. 4C and 4D are by this invnetion spindle control system. The time points on the time axis indicate the gear change start by $t_1$, the gear disengagement by $t_2$, the gear engagement by $t_3$ and the acceleration end by $t_4$.

As clearly indicated by FIG. 4D, the curve caused by the reduction of the motor speed falls more rapidly by the amount equivalent to inertia on the side of the spindle 9 (the spindle 9 is freely running between time points $t_1$ and $t_2$). The region where the speed is constant before time point $t_3$ is the period before the positional errors become stable. The period from $t_2$ to $t_3$ is the time when the gears are being engaged while the motor shaft is being swung.

As described in the foregoing statement, this invention spindle control system can freely engage/disengage gears while they are rotating by a simple gear change mechanism without requiring a synchronizing unit to thereby enable a remarkable reduction of the time required for the gear change, a decrease of the loads applied on the gears and ultimately an extention of the life of the gears.

It should be understood that many modifications and adaptations of the invention will become apparent to those skilled in the art and it is intended to encompass such obvious modifications and changes in the scope of the claims appended hereto.

What is claimed is:

1. A spindle control system of the type which controls a spindle in speed and position by a motor via a variable speed gear mechanism, which comprising a target position calculating means to calculate the position of a motor shaft when gears are engaged therewith based on a gear command, the detected postion of said spindle and the detected position of said motor shaft, a position control means to output speed commands for the motor shaft based on the result of the calculation by said target position calculating means, and a switch means to switch circuits so as to input said speed commands outputted from said position control means to a speed control circuit for said motor when gear engagement is to be changed.

2. A spindle control system as claimed in claim 1, wherein when said gear engagement is to be changed, said switch means is switched under the condition that the gear command indicating the set of gears which are presently engaged have been fed to said target position calculating means.

3. A spindle control system as claimed in claim 2, wherein said gear engagement is changed by a gear change sequence circuit and an actuator via said position control means.

4. A spindle control system as claimed in claim 1, wherein said target position calculating means and the position control means comprise a gear ratio multiplying means to input spindle position, a gear related parameter memory to input gear commands, an offset calculating means to calculate an offset angle between said spindle position and the motor shaft position, a first adding means to add the gear ratio outputted from said gear ratio multiplying means to said offset angle, a subtracting means to subtract said motor shaft position from the sum obtained by said first adding means, a differential means to differentiate said gear ratio, and a second adding means to add the result of subtraction from said subtracting means to the result of differentiation from said differential means to output speed commands for the motor shaft.

5. A spindle control system as claimed in claim 4, wherein a coefficient means is provided to multiply the subtraction result from said subtracting means by a constant.

6. A spindle control system as claimed in claim 5, wherein a switch is provided to turn on/off the output from said coefficient means.

* * * * *